United States Patent
Matzen

(10) Patent No.: US 7,052,050 B2
(45) Date of Patent: May 30, 2006

(54) ELASTOMERIC EXPANSION JOINT AND A WIRING SUPPORT MEMBER

(75) Inventor: Georg Heinrich Matzen, São Paulo (BR)

(73) Assignee: Dinatecnica Industria E. Comercio Ltda., (BR)

( * ) Notice: Subject to any disclaimer, the term of this patent is extended or adjusted under 35 U.S.C. 154(b) by 9 days.

(21) Appl. No.: 10/772,995

(22) Filed: Feb. 5, 2004

(65) Prior Publication Data

US 2005/0023829 A1 Feb. 3, 2005

(30) Foreign Application Priority Data

Jul. 29, 2003 (BR) .................................. 0302538

(51) Int. Cl.
*F16L 27/10* (2006.01)
(52) U.S. Cl. ...................................... 285/223; 285/229
(58) Field of Classification Search ........ 285/226–229, 285/222.1–222.5
See application file for complete search history.

(56) References Cited

U.S. PATENT DOCUMENTS

| | | | |
|---|---|---|---|
| 1,345,971 A * | 7/1920 | Richard | ....................... 285/226 |
| 1,696,435 A | 12/1928 | Fraley | |
| 2,692,782 A | 10/1954 | Jones | |
| 2,879,804 A * | 3/1959 | Hammond | ................... 285/229 |
| 3,039,795 A | 6/1962 | Reuter | |
| 3,051,512 A | 8/1962 | Cranston | |
| 3,305,251 A | 2/1967 | Skinner | |
| 3,429,592 A | 2/1969 | Merkwacz | |
| 3,580,616 A | 5/1971 | Merkwacz | |
| 3,976,312 A * | 8/1976 | Murphree | ................... 285/226 |
| 4,101,150 A | 7/1978 | Thawley et al. | |

FOREIGN PATENT DOCUMENTS

JP 2022039 1/1990

* cited by examiner

*Primary Examiner*—Aaron Dunwoody
(74) *Attorney, Agent, or Firm*—Alston & Bird LLP

(57) ABSTRACT

Provided are elastomeric expansion joints for coupling tubes and, particularly, elastomeric expansion joint used for absorbing axial, lateral, angular movements and vibrations to which the tubes are subjected, or when these tubes are coupled to pieces of equipment that operate under varied conditions of temperature and pressure and that result in movement of the tubing. The elastomeric expansion joint includes first and second end portions, a moveable central region, and first and second intersection portions that are respectively defined between each of the end portions and the central region. The intersection portions and the end portions define a reinforcement section. At least one wiring support member is positioned between the first and the second substrates, and the wiring support member is positioned in the reinforcement section and supports wirings. The wiring support member reinforces the elastomeric expansion joint, so that the elastomeric expansion joint can stand higher pressures.

14 Claims, 2 Drawing Sheets

ELASTOMERIC EXPANSION JOINT AND A WIRING SUPPORT MEMBER

BACKGROUND OF THE INVENTION

1) Field of the Invention

The present invention relates to elastomeric expansion joints for coupling tubes. In certain situations, the tubing has critical points of higher pressures, movements and temperature, and tends to expand and cause disengagement or even breakage due to fatigue of the tubes. In order to prevent such drawbacks, elastomeric expansion joints are used either between tube segments or between a tubing portion and some type of equipment, so as to absorb the movements to which they are subjected.

Movements to be absorbed by elastomeric expansion joints include, for example, axial movements (increase in the distance between determined tube segments), lateral movements (disagreement between the central axes of the tubes interconnected by the joint), angular movements and vibrations to which the tubes are subjected. Movements can also result when these tubes are coupled to pieces of equipment that operate under varied conditions, such as temperature and pressure.

Essentially, the elastomeric expansion joints comprise a tubular elastomeric body, for example, manufactured from Cloroprene, Nitrilo, EPDM, Natural, Hypalon, etc. according to the application need. They may also comprise inner coatings of PTFE (polytetrafluoretylene) for solving the different operational loads.

In order to meet the stresses provoked by the high pressures inside the tubes that are coupled, one usually provides internal reinforcements with fabrics of synthetic material in conjunction with reinforcement wires, which are aimed at guaranteeing greater strength for operation under internal pressure or even in situations of vacuum.

2) Description of Related Art

Some known solutions are provided with metallic reinforcements inside the elastomeric structure, so that the rupture pressures can be higher.

One of the solutions found in the prior art is described on U.S. Pat. No. 3,580,616. This document discloses an expansion joint reinforced with wound wires for increasing the strength of the assembly. In order to prevent movement of the wires, the latter are enveloped by a rubber mass and optionally accommodated on a layer of a more resistant type of rubber. With this solution, a reinforcement in the joint is achieved, without, however, resulting in a construction resistant to high pressures. One of the problems of this solution is that the spacing between the wires, as well as the support thereof on the rubber, may have the result that the wires move within the rubber throughout the use of the joint and may break when they go through the joint wall.

Another solution found in the prior art is described in U.S. Pat. No. 1,696,435. This document discloses an expansion joint comprising metal rings pressed from above and from below by layers of web, thereby to prevent the respective movement and direct contact with the more flexible rubber layer. One of the drawbacks of this type of construction lies in that the metal rings impart little flexibility to the joint and are of considerable thickness, which may cause fatigue of said webs in the event of movement of the whole assembly.

A prior technique is also known and described in U.S. Pat. No. 3,429,592. This solution follows the same concept of the documents cited above and comprises essentially metal rings accommodated inside layers of a more resistant type of rubber, defining a support to prevent movement of the rings. This solution, however, imparts little flexibility to the joint and results in a piece of considerable thickness, which may cause fatigue of the joint.

Other solutions may be found in documents JP 2022039, U.S. Pat. Nos. 3,051,512, 3,305,251, 2,692,782 and 4,101,150, which describe solutions that comprise a resistant enveloping element and arrangements to prevent it from moving. The enveloping elements are configured as rings and positioned separated from each other, causing wear of the material that envelops them. This separate positioning of the rings cause them to be in direct contact with the enveloping material, which is usually rubber or webs and, with the passing of time and the continuous movement of the joint, result in fatigue of the piece.

Another solution that tries to solve the problem of resistance to high pressures on expansion joints may be found in document U.S. Pat. No. 3,039,795, which discloses a flexible expansion joint that comprises a spiral metal element surrounding the joint. This spiral element is positioned around or inside the polyurethane layer, which, throughout the use of the joint, causes fatigue of the material, which is deformable.

Other solutions foresee the use of external flanges, on which the rubber portion of the joint will rest in order to bear higher pressures. According to these techniques, the external flanges rest on the external portions of the joint and extend along the outer surface of the joint, along the respective external portion, as far as the more central arched portion, thus forming a metallic cylindrical portion that lines the joint.

Although this solution results in a joint that supports higher pressure, its flexibility is very impaired, which, in turn, results in low performance in absorbing vibrations, compression, angular movement, etc. Moreover, in addition to the low performance of this type of joint as far as the flexibility aspect is concerned, the use of this type of external flanges bring extra cost for the final product.

BRIEF SUMMARY OF THE INVENTION

The main objective of the present invention is to provide an elastomeric expansion joint capable of absorbing axial, lateral, angular movements and vibrations, and capable of bearing higher pressures without the use of external flanges, without the need to increase the amount of material to manufacture it and without the need to employ metal rings, still having long durability and high flexibility, that is to say, it should have a low elastic constant.

It is another objective of the present invention to provide an elastomeric expansion joint of a size equal to that of prior art joints and that, at the same time, can bear high pressures and vacuum of up to 25 in of Hg (635 mmHg).

A further objective of the present invention is to provide an elastomeric expansion joint that does not have the problem of movement of the wires, thus preventing the elastomeric expansion joint from tearing, as happens with joints manufactured according to the teachings of the prior art.

Another objective of the present invention is to provide a construction for an elastomeric expansion joint that may be employed in various types of joints having one or more moving portions, different diameters, and further has a low manufacture cost.

A further objective of the present invention is to provide a rigid profile (e.g., wiring support member) that has low cost and that may be used as a support base for the wirings, the wirings having the purpose of raising the capacity of the elastomeric expansion joint to bear high pressures.

The objectives of the present invention are achieved by means of an elastomeric expansion joint that comprises at least one first substrate, at least one second substrate, at least a first fabric layer arranged between the first and the second substrates, defining a tubular section, the tubular section comprising first and a second end portions, a central moveable region, first and a second intersection portions defined respectively between the end portions and the central portion, the intersection portions and the end portions defining a reinforcement section, the elastomeric expansion joint comprising at least one reinforcement profile (e.g., wiring support member) positioned between the first and the second substrates, the profile being positioned in the reinforcement section, the reinforcement profile extending along a perimeter of the tubular section (e.g., extending around the central axis of the tubular section) and supporting a first reinforcement wiring along its length, and the intersection portions comprising a second reinforcement wiring, the second reinforcement wiring being provided between the first and second substrates.

The objectives of the present invention are also achieved by means of a manufacturing method, which comprises the steps of molding a first substrate on a mount profile; defining a central moveable region, two end portions and two intersection portions; placing first profiles (e.g., wiring support members) along the end portions, the first profiles each comprising a base and retention walls, the retention walls configuring a retention region; winding a first wiring in the retention regions so that the first wiring is supported on the first profiles; and winding a second wiring on the intersection portions; placing a second layer of substrate; and vulcanizing the elastomeric expansion joint.

The objectives of the present invention are further achieved by means of a profile (e.g., wiring support member) to be applied to the reinforcement of the elastomeric expansion joint, such a profile comprising a substantially annular body and being provided with retention walls for the winding of reinforcement wirings along its length.

BRIEF DESCRIPTION OF THE DRAWINGS

The present invention will now be described in greater detail with reference to an embodiment represented in the drawings, wherein.

DETAILED DESCRIPTION OF THE INVENTION

Figure 1:
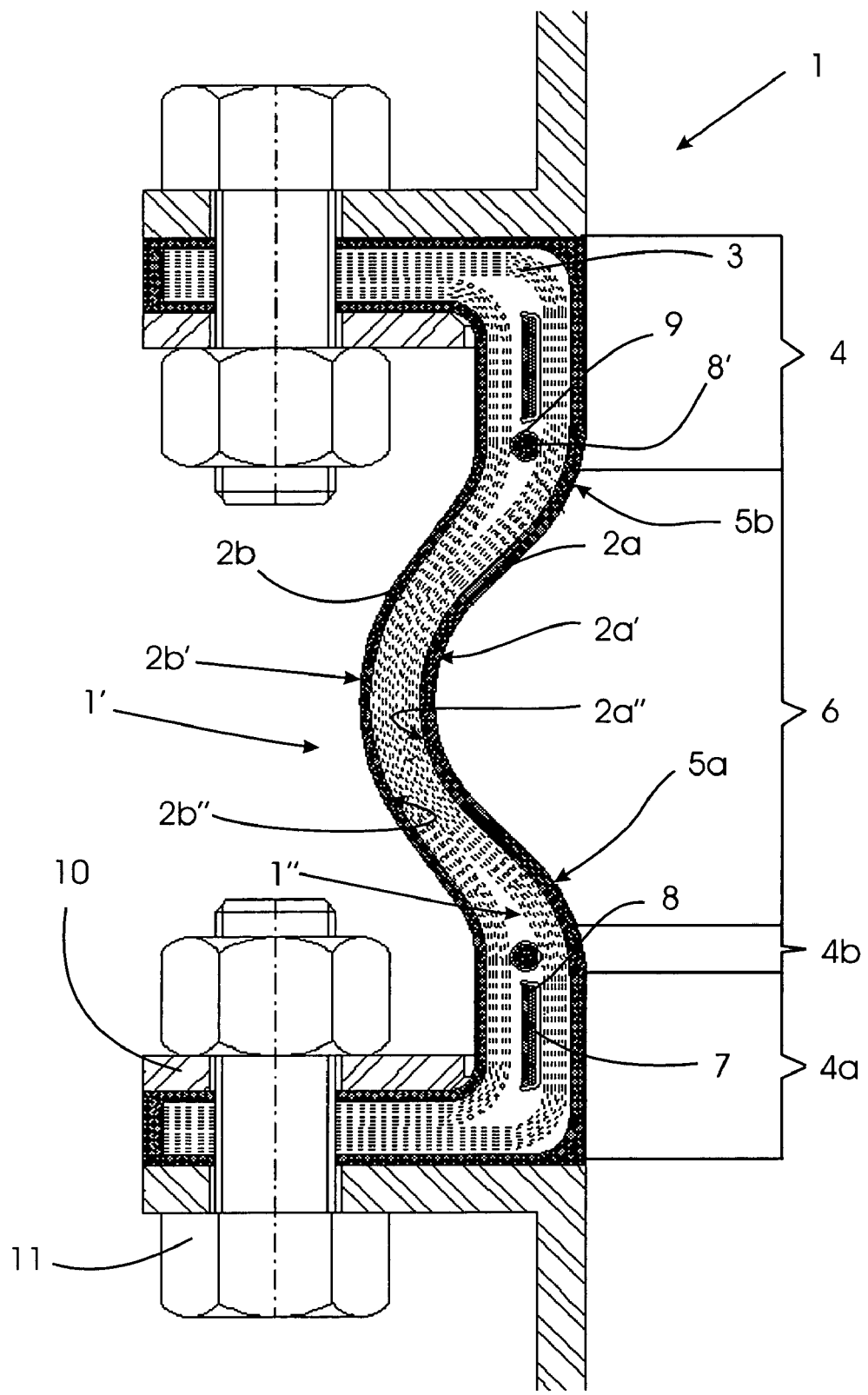
FIG. 1 is a cross-sectional view of the elastomeric expansion joint of the present invention.

As can be seen in FIG. 1, the elastomeric expansion joint 1, according to an embodiment of the present invention, essentially comprises a first substrate 2a and a second substrate 2b, and a plurality of layers of rubberized fabric 3 arranged between the first and second substrates 2a, 2b. Such elements are shaped so as to define a tubular section 1', which will be coupled to a tubing (not shown). When necessary, one applies more than one layer of first substrate 2a and layers of a second substrate 2b. The number of layers may vary from two or more.

The tubular section 1' essentially comprises a reinforcement section 4, arranged close to the farthest end portions of the tubular section 1', and a central moveable region 6, arranged in the most central portion of the tubular section 1'.

The reinforcement section 4, in turn, comprises end portions 4a, 4b and intersection regions 5a, 5b.

The intersection portions 5a, 5b are defined between the end portions 4a, 4b and the central region 6.

The central region 6 has to be arched and may be, in certain cases, made from a number of arches for the purpose of absorbing the movements of the tubing.

Figure 2:
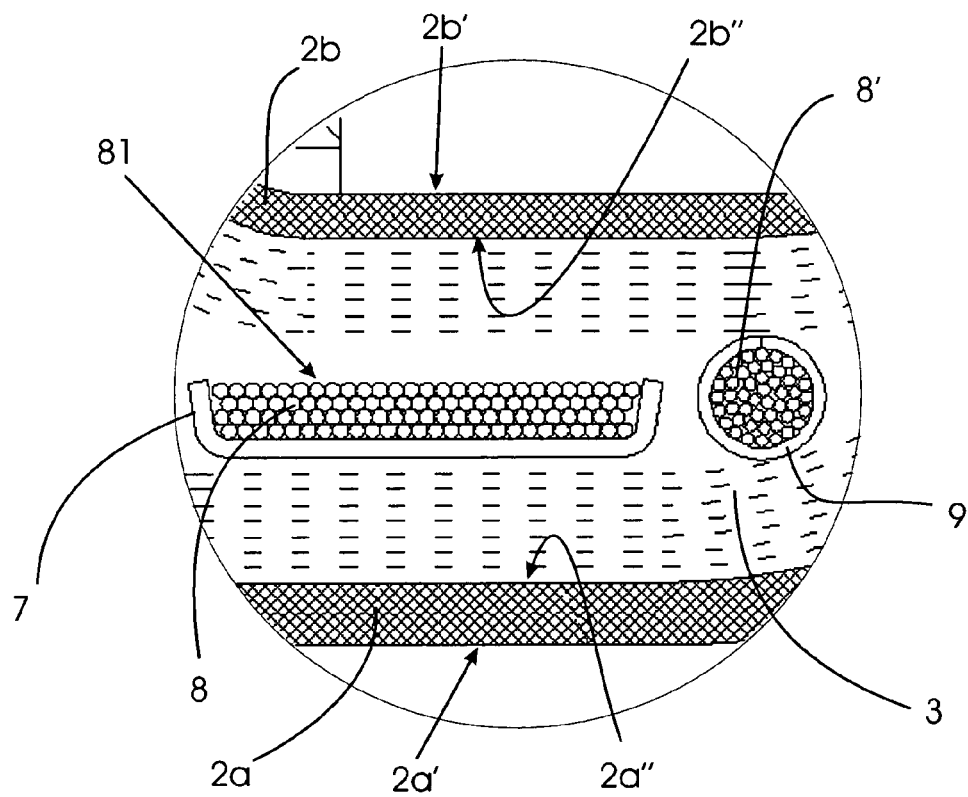
FIG. 2 is a cross-sectional view detailing the profiles (e.g., wiring support members) positioned on the elastomeric expansion joint of the present invention.

As can be seen in detail in FIG. 2, the first substrate 2a has an internal surface 2a' facing the innermost portion of the tubular section 1', as well as a first contact surface 2a", which faces the inside of the tubular wall 1" of the elastomeric expansion joint 1 and on which a plurality of layers of rubberized synthetic fabric 3 are usually arranged.

The second substrate 2b has a outer surface 2b' with respect to the elastomeric expansion joint 1 and a second contact surface 2b". The second contact surface 2b" remains in constant contact with the fabric layers 3.

The fabric layers 3 may comprise fabric of synthetic material, and they are molded on the first contact surface 2a", so as to take on the shape of an elastomeric expansion joint 1. Depending upon the application needs, the elastomeric expansion joint 1 may comprise a plurality of fabric layers 3 to reinforce the elastomeric expansion joint 1 as a whole.

In order for the elastomeric expansion joint 1 of the present invention to meet the expectations of resistance to pressure, as determined by rules such as ASTM and DIN, profiles (e.g., wiring support members) for supporting reinforcement wires or wiring 8,8' are provided, so that the latter may be fixedly drawn tight and, consequently, the elastomeric expansion joint 1 may have a breaking stress at higher levels.

As can be seen in the figures, reinforcement profiles 15 (e.g., wiring support members) are provided, which are positioned between the first and the second substrates 2a, 2b and have the purpose of reinforcing the elastomeric expansion joints 1, with each of the reinforcement profiles 15 having a substantially annular body and being provided with retention walls for winding a reinforcement wiring 8, 8' along its perimeter.

The reinforcement profiles 15, in turn, comprise a first reinforcement profile 7 and a second reinforcement profile 9 (FIG. 2), which extend along a perimeter of (e.g., extend around the central axis of) the tubular section 1' and respectively support first and second reinforcement wirings 8,8' along their lengths.

Figure 3:
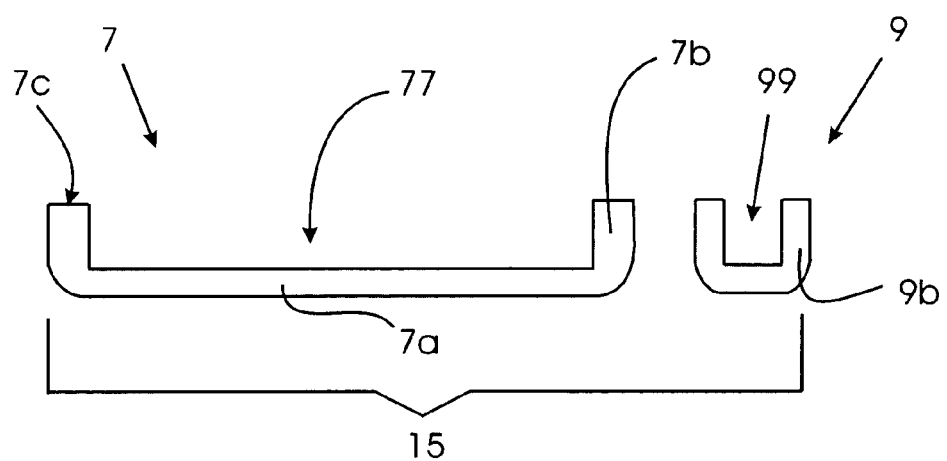
FIG. 3 is a cross-sectional view of the profile of the present invention.

In FIGS. 2 and 3, one can see that the first reinforcement profile 7 should preferably have a base 7a and retentions walls 7b, so as to define a retention region 77. The retention walls 7b are preferably substantially perpendicular to the base 7a. However, the angle between the base 7a and the retention walls 7b may vary according to the needs, and one should consider that the retention walls 7b should keep the reinforcement wirings 8 firmly supported.

The profiles 7 are positioned between the first and second substrates 2a, 2b in the end portions 4a of the elastomeric expansion joint 1, outwardly of the inner fabric layers 3, the bases being preferably positioned parallel to the first and second substrates 2a, 2b.

In FIG. 2, one may see in details that the profiles 7 support a first reinforcement wiring 8, which is wound along an entire perimeter of the elastomeric expansion joint 1, so that the respective wires 81 will remain drawn tight close to the base 7a and retained by the retentions walls 7b. The height of the wires 81 overlapped should not exceed the height of the walls 7b.

According to one of the preferred embodiments of the present invention, one provides the winding of a second wiring 8' in the intersection regions 5a and 5b, so as to impart greater resistance to the elastomeric expansion joint 1.

In the case where the joint 1 has a larger diameter, one provides, according to the teachings of the present invention, a second reinforcement profile 9. In these cases, one achieves an elastomeric expansion joint 1 that comprises two or more first profiles 7 and two second profiles 9.

As can be seen in the figures, the second reinforcement profile 9 should preferably have retention walls 9b defining a retention region 99, and an upper opening. Inside the second profile 9, the second wiring 8' is positioned with overlapping wires.

The second reinforcement profiles 9b are applied in a similar way as the first profiles 7, that is to say, they are positioned between the first 2a and the second 2b substrates, but close to the intersection regions 5a and 5b, outwardly of the inner fabric layers 3.

After winding of the second wiring 8', the second profiles 9, which are originally open, should be closed so as to prevent movement of the second wiring 8' and, at the same time, to configure a circular profile, and so that this second wiring 8' will be enclosed. The shape of the circular profile prevents it from exerting shearing stress on the piece while moving, this being the functional shape of the profile 9 for the purpose of the invention.

The first and second profiles 7, 9 have the function of preventing sheering stress on the elastomeric expansion joint by direct contact of the first and second wirings 8, 8' with the fabric 3 and, at the same time, supporting them. The second profiles 9 additionally have the function of not allowing the tubular section to lose its functional section during the deformation of the piece.

For capping the first and second profiles 7, 9, one provides fabric layers 3 to cover the first and second profiles 7, 9 along the elastomeric expansion joint 1 and the second substrate 2b.

Prior to placing fabric layers 3, the previous layer, be it of first wiring 8 or first and second substrates 2a, 2b, is preferably moistened with an adherent chemical preparation, usually a solvent, to increase the respective tack of the fabric.

All the elements are compacted, and the elastomeric expansion joint 1 is subjected to a vulcanization process that makes the piece into a whole, resulting in the elastomeric expansion joint 1 being a single piece.

Finally, retaining rings 10 are provided, which are fixed by means of a fixture 11, such as screws and nuts on a tubing at the time of assembling it in field.

Concerning the materials used to manufacture the elastomeric expansion joint 1 of the present invention, one uses, for example, a polymeric material such as Cloroprene rubber, Nitrilo, EPDM, natural rubber, Hypalon, etc. in manufacturing the first and second substrates 2a, 2b. The same materials may be employed in manufacturing the fabrics 3.

Since in certain cases it is recommendable to protect the inner surface 2a' of the elastomeric expansion joint 1 against products that may react with the rubber, for instance, one may provide a PTFE (polytetrafluoroethylene) layer along the inner surface 2a'. Such an embodiment enables the elastomeric expansion joint 1 to be used in transporting corrosive fluids, wherein the material of the elastomeric expansion joint 1 may not react with the transported fluid. That is, for the embodiment of the elastomeric expansion joint 1 illustrated in the figures, the elastomeric expansion joint 1 consists of a substantial amount of elastomeric material (e.g., rubber and/or various elastic substances resembling rubber), and a protective layer along the inner surface 2a' can protect the elastomeric expansion joint 1 against products that may react with the elastomeric material.

With regard to the first and second profiles 7, 9, they are preferably made from metal, for example, carbon steel, but they may be manufactured from another material, as long as it meets the same characteristics, that is to say, they must be rigid enough to support the first and second wirings 8, 8', without the need to provide a structural reinforcement for the elastomeric expansion joint 1, since the rigidity is mainly imparted by the wirings.

With regard to the material employed in the first and second wirings 8, 8', one preferably uses a flexible wire of stainless or carbon steel. Other materials may be used, as long as they meet the conditions necessary for the joint 1 to bear the pressures foreseen by the above-cited rules.

The number of turns of the first and second wirings 8, 8', as well as the tensioning thereof, is variable and should be adequate according to the necessity of each case.

The diameters of the first and second end portions 4a, 4b, defined by the tubular section 1', are preferably the same, but they may be different from each other, thereby configuring a conical elastomeric expansion joint with end portions of different diameters, thus being applicable to tubing of different diameters. In this embodiment, the diameters of the first and second profiles 7, 9, as well as the number of turns of the first and second wirings 8,8' should be made adequate.

The elastomeric expansion joint 1 of the present invention is achieved by means of a manufacturing method that comprises the following steps:

Molding, in a first step, the first substrate 2a on a substantially cylindrical mount profile (not shown) with an arched projection in the most central region, the mount profile being rotary, and the layers that form the elastomeric expansion joint 1 being mounted on it. The most central arched region of the mount profile gives the shape of the central moveable region 6 to the elastomeric expansion joint 1, while the outermost end portions of the mount profile defines the shapes of the two end portions 4a, 4b and the two intersection portions 5a, 5b.

In this way, the shape of the mount profile should be adequate to the type and size of elastomeric expansion joint 1 that one intends to mount.

After the step of molding the first substrate 2a on the mount profile, the first contact surface 2a'' is moistened with the adherent chemical preparation.

There is a step of placing rubberized fabric layers 3 onto the substrate 2a, so as to cover the first contact surface 2a''.

Then, the reinforcement profiles 7 are positioned along the end portions 4a, 4b on the fabric layers 3.

In the following step, the first wiring 8 is positioned on the profiles 7, which consists in winding wires in the retention region 77, until the latter has been filled up to terminuses 7c or until the number of turns is sufficient for the elastomeric expansion joint 1 to bear the necessary pressures according to the project.

After this step, the second wiring 8' is positioned in the intersection portions 5a, 5b. The winding of wires is also made by applying the number of turns required for the elastomeric expansion joint 1 to meet the needs of the project. This part of the above process cited above proved to be more functional, but other forms may be foreseen, as for instance, the step of positioning the second wiring 8' may evidently occur before the step of positioning the reinforcement profiles 7, or after it and intercalated with the step of applying the first wiring 8 onto the profiles 7, without interfering with the process in question.

After this, the exposed surfaces are moisturized with the adherent chemical preparation and then the fabric layers 3 are applied, after which a new moistening is carried out with the adherent chemical preparation.

As a final step of the mounting process, the substrate layer 2b is applied, closing the tubular section 1' of the elastomeric expansion joint 1.

In order for the elastomeric expansion joint 1 to reach its final shape, that is to say, for the layers applied in the above cited steps to be made into a single piece, the whole assembly undergoes a vulcanization process. Placing covers that will help in forming the elastomeric expansion joint during the vulcanization may also be foreseen.

Once the piece has been vulcanized, the metallic retaining rings 10 are applied to the ends of the elastomeric expansion joint 1, such retaining rings 10 being fixed by means of the fixtures 11, for instance, screws.

After the step of placing the first wiring 8 on the first reinforcement profiles 7, one may further foresee the placement of the second rein forcement profiles 9 in the intersection portions 5a, 5b, before winding the second wiring 8'. In this option, the second wiring 8' will be wound in the retention region 99 of the second profiles 9, so that the arched retention walls 9b on the retention region 99 can be closed with the help of a hammer or a similar instrument, thus forming a tubing.

The elastomeric expansion joint 1 built according to the teachings of the present invention results in a piece that bears much higher pressures than in the case of the joints built according to the teachings of the prior art.

At the same time, by employing the first and second profiles 7, 9, the problems of shearing stress on the elastomeric expansion joint 1 in the region where the wire is directly resting on the rubber is prevented and, consequently, this prevents the wires from tearing the rubber portion and damaging the elastomeric expansion joint 1, without the need to use metallic reinforcements.

The elastomeric expansion joint 1 made according to the teachings of the present invention further results in a piece of long durability, since the movements of the wires within the rubber is eliminated with the respective resting on the first and second profiles 7, 9.

The elastomeric expansion joint 1 has high flexibility, that is to say, its spring constant is low and, even so, the spring withstands even a very high negative pressure (total vacuum), without the need to insert metallic structures in the form of a ring for supporting the central region 6.

The practice shows that the elastomeric expansion joint 1 made according to the teachings of the present invention withstands at least a high negative pressure of vacuum of up to 25 in. Hg (635 mmHg), and positive pressures in the Class 150 and/or 300, that is, 150 PSIG (10 kgf/cm2) and/or 300 PSIG (20 kgf/cm$^2$).

In the economical aspect, the elastomeric expansion joint 1 of the present invention brings significant advantages in comparison with those of the prior art, since by using the first and second profiles 7, 9, the costs are lower than those of the other solutions, without thereby impairing the mechanical characteristics of the piece.

In addition, the teachings of the present invention may further be employed in the various forms of elastomeric expansion joints, which may vary in diameter, comprise a central moveable region 6 or foresee a number of moveable regions 6 and further be applied to conical or similar joints.

A preferred embodiment having been described, it should be understood that the scope of the present invention embraces other possible variations, being limited only by the contents of the accompanying claims, which include the possible equivalents.

That which is claimed:

1. An elastomeric expansion joint comprising:
   at least one first substrate;
   at least one second substrate;
   fabric layers arranged between the first and the second substrates, defining a tubular section, wherein:
      the tubular section comprises:
         first and second end portions,
         a moveable central region, and
         first and second intersection portions which are respectively defined between each of the end portions and the central region, and
      the intersection portions and the end portions define a reinforcement section;
   a first reinforcement wiring positioned in the reinforcement section;
   a second reinforcement wiring positioned between the first and second substrates in the intersection portions; and
   at least one wiring support member positioned between the first and the second substrates, wherein the wiring support member:
      is positioned in the reinforcement section,
      extends at least partially around a central axis of the tubular section, and
      supports at least the first reinforcement wiring along its length,
   wherein the wiring support member comprises a first wiring support member, the first wiring support member comprises a base and retention walls, the retention walls define a retention region therebetween, and the first reinforcement wiring is positioned in the retention region, the base of the first wiring support member is positioned parallel to the first and second substrates, with the retention region facing the second substrate, the wiring support member supports a plurality of overlapping layers of the first reinforcement wiring, the plurality of layers of the first reinforcement wiring is arranged in the retention region up to terminuses of the retention walls, and wherein second wiring support members are respectively positioned in the first and second intersection portions, each of the second wiring support members comprises retention walls defining a retention region therebetween, with the second reinforcement wiring positioned in the retention regions of the second wiring support members, and for each of the second wiring support members, the retention walls of the second wiring support member are arched over the retention region so that the retention region is closed.

2. An elastomeric expansion joint according to claim 1, wherein each of the second wiring support members is substantially tubular.

3. An elastomeric expansion joint according to claim 2, wherein at least one fabric layer envelopes the second reinforcement wiring.

4. An elastomeric expansion joint according to claim 3, wherein the first and second wiring support members are made of a rigid material.

5. An elastomeric expansion joint according to claim 3, wherein the first and second wiring support members are made of a metallic material.

6. An elastomeric expansion joint according to claim 5, wherein there are at least two first wiring support members and two second wiring support members.

7. An elastomeric expansion joint according to claim 6, wherein the first and second reinforcement wirings are composed of flexible metal wires.

8. An elastomeric expansion joint according to claim 1, wherein the end portions respectively end in retaining rings.

9. An elastomeric expansion joint according to claim 1, wherein the first and the second substrates are made of a polymeric material.

10. An elastomeric expansion joint according to claim 1, wherein a polytetrafluorethylene layer is provided overlapping a surface of the second substrate and a surface of the first substrate.

11. An elastomeric expansion joint according to claim 1, wherein the wiring support member comprises:
a substantially annular body having retention walls for at least partially facilitating lengthwise winding of the reinforcement wiring around the wiring support member.

12. An elastomeric expansion joint according to claim 11, wherein the annular body further comprises a base from which the retention walls extend radially outward, wherein a retention region is at least partially defined between the retention walls, and the retention region is for receiving the reinforcement wiring.

13. An elastomeric expansion joint according to claim 12, wherein a cross-section of the wiring support member is substantially U-shaped, with the cross-section being taken along a plane which is parallel to and intersects an axis which the wiring support member extends around.

14. An elastomeric expansion joint according to claim 1, wherein the wiring support member is positioned entirely within the reinforcement sections such tat the wiring support member supports the first reinforcement wiring without preventing movement of the moveable central region.

* * * * *

UNITED STATES PATENT AND TRADEMARK OFFICE
CERTIFICATE OF CORRECTION

| | | |
|---|---|---|
| PATENT NO. | : 7,052,050 B2 | Page 1 of 1 |
| APPLICATION NO. | : 10/772995 | |
| DATED | : May 30, 2006 | |
| INVENTOR(S) | : Matzen | |

It is certified that error appears in the above-identified patent and that said Letters Patent is hereby corrected as shown below:

Column 7,

Line 26, "rein forcement" should read --reinforcement--.

Column 10,

Line 18, "tat" should read --that--.

Signed and Sealed this

Fifth Day of December, 2006

JON W. DUDAS
*Director of the United States Patent and Trademark Office*